US012601647B2

(12) United States Patent
Han et al.

(10) Patent No.: US 12,601,647 B2
(45) Date of Patent: Apr. 14, 2026

(54) SYSTEM FOR DETERMINING CAUSE OF ELECTRODE CONNECTION AND ROLL MAP GENERATION SYSTEM USING SAME

(71) Applicant: LG ENERGY SOLUTION, LTD., Seoul (KR)

(72) Inventors: Ki Deok Han, Daejeon (KR); Byoung Eun Han, Daejeon (KR); Gi Yeong Jeon, Daejeon (KR); Jae Hwan Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 349 days.

(21) Appl. No.: 18/273,535

(22) PCT Filed: Sep. 1, 2022

(86) PCT No.: PCT/KR2022/013145
§ 371 (c)(1),
(2) Date: Jul. 20, 2023

(87) PCT Pub. No.: WO2023/033573
PCT Pub. Date: Mar. 9, 2023

(65) Prior Publication Data
US 2024/0094077 A1     Mar. 21, 2024

(30) Foreign Application Priority Data

Sep. 2, 2021     (KR) ........................ 10-2021-0117213

(51) Int. Cl.
*G01L 5/04*         (2006.01)
*B65H 19/18*        (2006.01)
(Continued)

(52) U.S. Cl.
CPC ............ *G01L 5/047* (2013.01); *B65H 23/044* (2013.01); *H01M 10/058* (2013.01);
(Continued)

(58) Field of Classification Search
CPC ............ B65H 19/1873; B65H 19/1836; B65H 23/044; B65H 23/046; B65H 2801/72;
(Continued)

(56) References Cited

U.S. PATENT DOCUMENTS 11,319,179 B2 *   5/2022   Nagai ........................ D21F 9/00
2009/0011121 A1 *  1/2009   Kato ...................... H01M 4/139
427/116

FOREIGN PATENT DOCUMENTS

CN       102403538 A   *   4/2012
CN       206639873 U   *   11/2017
(Continued)

OTHER PUBLICATIONS

Translation_CN102403538 (Year: 2011).*
Translation_CN_110586650 (Year: 2019).*

*Primary Examiner* — Peter J Macchiarolo
*Assistant Examiner* — Monica S Young
(74) *Attorney, Agent, or Firm* — Bryan Cave Leighton Paisner LLP

(57)           ABSTRACT

An electrode connection cause determination system includes a position measuring instrument. The position measuring instrument is configured to, when an electrode moves between an unwinder and a rewinder in a roll-to-roll state, acquire coordinate value data based on a longitudinal position of the electrode determined according to a rotation amount of the rewinder. The system includes a signal generator configured to generate a connection advance notice signal if the electrode includes a connecting portion corresponding to a cause event, a seam detector configured to detect a seam attached onto the electrode after the connection advance notice signal is generated, and a deter- mination unit configured to, when the seam is detected within a predetermined distance from a first coordinate value of the electrode after the connection advance notice signal is (Continued)

generated, determine that a connection cause of an electrode connection by the seam corresponds to the cause event.

15 Claims, 9 Drawing Sheets

(51) Int. Cl.
  *B65H 23/04*          (2006.01)
  *B65H 26/02*          (2006.01)
  *H01M 10/058*          (2010.01)

(52) U.S. Cl.
  CPC ...... *B65H 19/1836* (2013.01); *B65H 19/1873* (2013.01); *B65H 23/046* (2013.01); *B65H 26/025* (2013.01); *B65H 2553/51* (2013.01)

(58) Field of Classification Search
  CPC ............ B65H 2557/65; B65H 2557/62; B65H 2557/24; B65H 2553/51; B65H 2513/50; B65H 2301/542; B65H 2301/46414; B65H 2301/46412; B65H 2301/46312; B65H 2301/4621; B65H 2301/46172; B65H 26/025; B65H 2301/46011; G01L 5/047; Y02E 60/10; H01M 10/058; H01M 10/04
  USPC ...................................................... 73/862.391
  See application file for complete search history.

(56) References Cited

FOREIGN PATENT DOCUMENTS

| | | | | | |
|---|---|---|---|---|---|
| CN | 110586650 | A | * | 12/2019 | .......... H01M 4/0435 |
| CN | 113894164 | A | * | 1/2022 | ............. B21B 38/06 |
| CN | 116799275 | A | * | 9/2023 | ........ H01M 10/0404 |
| JP | 01-88654 | U | | 6/1989 | |
| JP | H01303259 | A | | 12/1989 | |
| JP | 10-45302 | A | | 2/1998 | |
| JP | 11-343056 | A | | 12/1999 | |
| JP | 2003035702 | A | | 2/2003 | |
| JP | 2006-234771 | A | | 9/2006 | |
| JP | 2007-315901 | A | | 12/2007 | |
| JP | 2010-197108 | A | | 9/2010 | |
| JP | 5201687 | B2 | | 6/2013 | |
| JP | 6035877 | B2 | | 11/2016 | |
| JP | 2018052692 | A | * | 4/2018 | |
| JP | 2018055971 | A | * | 4/2018 | |
| JP | 2019-191127 | A | | 10/2019 | |
| JP | 6713278 | B2 | | 6/2020 | |
| JP | 6728291 | B2 | | 7/2020 | |
| JP | 6760997 | B2 | | 9/2020 | |
| JP | 2021-082384 | A | | 5/2021 | |
| JP | 2021-516432 | A | | 7/2021 | |
| JP | 2024-512864 | A | | 3/2024 | |
| KR | 101627555 | B1 | * | 6/2016 | ............. G06F 3/041 |
| KR | 10-1695650 | B1 | | 1/2017 | |
| KR | 10-2017-0060724 | A | | 6/2017 | |
| KR | 10-2020-0059026 | A | | 5/2020 | |
| KR | 10-2206908 | B1 | | 1/2021 | |
| KR | 10-2021-0048327 | A | | 5/2021 | |

* cited by examiner

SYSTEM FOR DETERMINING CAUSE OF ELECTRODE CONNECTION AND ROLL MAP GENERATION SYSTEM USING SAME

CROSS-REFERENCE TO RELATED APPLICATION

This application is a National Phase entry pursuant to 35 U.S.C. 371 of International Application No. PCT/KR2022/011506 filed on Aug. 3, 2022, which claims priority to and the benefit of Korean Patent Application No. 10-2021-0117213, filed on Sep. 2, 2021, and the entire contents of the Korean patent applications are incorporated herein by reference.

TECHNICAL FIELD

The present disclosure relates to a determination system for determining a cause of an electrode connection when a seam is detected in the electrode in an electrode manufacturing process.

Further, the present disclosure relates to a roll map generation system using the determination system.

BACKGROUND

As development and demand for technology for mobile devices increase, the demand for secondary batteries is also rapidly increasing. Among secondary batteries, lithium secondary batteries have high energy density, a high operating voltage, and excellent storage and lifetime characteristics, and thus have been widely used as energy sources for various electronic products as well as various types of mobile devices.

An electrode manufacturing process for manufacturing an electrode of a lithium secondary battery includes a plurality of sub-processes such as a coating process for forming a positive electrode and a negative electrode by coating a surface of a metal electrode plate, which is a current collector, with an active material and a predetermined insulating material, a roll press process for rolling the coated electrodes, and a slitting process for cutting the rolled electrodes according to their dimensions.

In the electrode manufactured in the electrode manufacturing process, an electrode tab is formed by a notching process, an electrode assembly is formed by interposing a separator between a positive electrode and a negative electrode, and then the form of a secondary battery is made through an assembly process of stacking or folding electrode assemblies to be packaged in a pouch or can and injecting an electrolyte into the electrode assembly. Thereafter, the secondary battery made through an assembly process is charged or discharged, undergoes an activation process for imparting battery characteristics, and becomes a final secondary battery in a finished product form.

In the electrode manufacturing process, each sub-process is performed while the electrodes are moved between an unwinder and a rewinder in a roll-to-roll state. In this process, for example, a seam may be formed in the electrodes due to an electrode breakage or removal of a defective electrode part. That is, there are cases in which disconnected electrodes or a defective electrode part is removed and the electrodes are connected by bonding a connecting tape to the electrodes. Alternatively, in a so-called splicing process for connecting an end part of one electrode and a beginning part of the other electrode for material replacement, the electrodes may be connected through a connecting tape.

However, conventionally, only a position of a seam (connecting tape) may be identified by a seam detector, and it is difficult to ascertain the cause of the seam occurrence. When information on the cause of the seam occurrence is known, it is easy for a quality trace of the electrodes in subsequent processes. Further, when a defect occurs in a battery cell manufactured with the electrodes, information on the seam may be required in order to analyze a cause of the defect.

Recently, in the electrode manufacturing process, by generating a roll map on which an electrode in a simulated form moving in a roll-to-roll state is displayed and predetermined coordinates of data related to a longitudinal position of the electrode is displayed, information on various types of events occurring in the electrode during the electrode manufacturing process may be recorded on the roll map. When the roll map is generated, information on the quality of the electrode and a defect during an electrode coating process, a roll press process, a slitting process, etc. may be displayed on the roll map. According to the roll map, it is very convenient to analyze the quality correlation in the electrode manufacturing process because it is possible to know the progress of the electrode, a change in length of the electrode, and the occurrence of a defect in a previous process of each sub-process of the electrode manufacturing process. Further, subsequent processes may be efficiently performed by referring to information on the roll map in the subsequent processes.

Meanwhile, the position of the above-described seam may be indicated with coordinates to be displayed on the roll map. In this case, when the cause of the seam occurrence can be displayed, history information on the electrode connection in the electrode manufacturing process can be checked at a glance.

Therefore, it is necessary to develop a technique in which, when a connection part is generated in an electrode during an electrode manufacturing process, a cause of the occurrence of the electrode connection part or seam can be accurately identified or can be displayed on a roll map.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY

An object of the present disclosure is to provide an electrode connection cause determination system capable of simply and accurately determining a cause of and electrode connection occurring in an electrode manufacturing process in which electrodes move in a roll-to-roll state.

Another object of the present disclosure is to provide a roll map generation system capable of displaying a cause of an electrode connection on a roll map using the above-described electrode connection cause determination system.

The present disclosure is directed to solving the above-described problem and is providing an electrode connection cause determination system including a position measuring instrument configured to, when an electrode moves between an unwinder and a rewinder in a roll-to-roll state, acquire coordinate value data based on a longitudinal position of the electrode determined according to a rotation amount of the rewinder; a signal generator configured to generate a connection advance notice signal if the electrode includes a connecting portion corresponding to a cause event; a seam detector configured to detect a seam attached onto the electrode after the connection advance notice signal is generated; and a determination unit configured to, when the seam is detected within a predetermined distance from a first coordinate value of the electrode after the connection advance notice signal is generated, determine that a connection cause of an electrode connection by the seam corresponds to the cause event.

The position measuring instrument may be a rotary encoder, and wherein the rotary encoder derives the longitudinal position of the electrode based on a rotation amount of a motor driving the rewinder, and wherein the rotation amount of the motor corresponds to the coordinate value data.

The signal generator and the seam detector may be configured to communicate with the position measuring instrument to acquire the first coordinate value of the electrode the connection advance notice signal is generated and a second coordinate value of the electrode corresponding to a location of the seam on the electrode.

The electrode connection cause determination system may further include a controller configured to control a movement of the electrode between the unwinder and the rewinder and to communicate with the position measuring instrument to acquire the coordinate value data based on the longitudinal position of the electrode, wherein the controller is connected to the signal generator and the seam detector, and wherein the controller is configured to acquire the first coordinate value of the electrode when the connection advance notice signal is generated and a second coordinate value of the electrode corresponding to a location of the seam on the electrode.

The determination unit may be in the controller or in a manufacturing execution system (MES) that manages an electrode manufacturing process.

The MES may include a roll map generation unit configured to generate a roll map, wherein the roll map may include a simulated electrode in the roll-to-roll state, wherein and the roll map comprises predetermined coordinates of the longitudinal position of the electrode and a position of the seam, and wherein the roll map generation unit may be configured to display the roll map and the connection cause of the electrode connection at the position of the seam on the roll map.

The cause event may be an electrode disconnection due to an electrode breakage, the signal generator may be a tension sensor configured to detect tension of the electrode moving in the roll-to-roll state, and when the seam is detected within a first distance defined by adding a total equipment distance from the rewinder the unwinder with a second distance corresponding to a second coordinate value of the electrode when a sensing signal is generated by the tension sensor, the determination unit may be configured to determine that a connection cause of the electrode connection by the seam corresponds to the electrode breakage.

The cause event may be scrap disposal of removing and discarding a defective portion of the electrode, the signal generator may be a manual input unit installed in a defect removal port, and when the seam is detected within a first distance defined by adding a second distance from the rewinder to the defect removal port with a third distance based on a second coordinate value of the electrode when an input signal is received by the manual input unit, the determination unit may be configured to determine that a connection cause of the electrode connection by the seam corresponds to the scrap disposal.

The cause event may be electrode splicing of connecting an old electrode and a new electrode for electrode replacement, the signal generator may be an input unit, and the input unit may be configured to receive a replacement signal, and when the seam is detected within a first distance defined by adding a second distance from the rewinder to a splicing unit with a third distance based on a second coordinate value of the electrode when the replacement signal is received by the input unit, the determination unit may determine that a connection cause of the electrode connection by the seam corresponds to the electrode splicing for the electrode replacement.

The present disclosure is also directed to solving the above-described problem and is providing a roll map generation system including a position measuring instrument configured to, when an electrode moves between an unwinder and a rewinder in a roll-to-roll state, acquire coordinate value data based on a longitudinal position of the electrode determined according to a rotation amount of the rewinder; a signal generator configured to generate a connection advance notice signal if the electrode includes a connection portion corresponding to a cause event; a seam detector configured to detect a seam attached onto the electrode after the connection advance notice signal is generated; a determination unit configured to, when the seam is detected within a predetermined distance from a first coordinate value of the electrode after the connection advance notice signal is generated, determine that a connection cause of the electrode connection by the seam corresponds to the cause event; and a roll map generation unit may be configured to generate a roll map including a simulated electrode in the roll-to-roll state, and the roll may include predetermined coordinates of the longitudinal position of the electrode and a position of the seam, wherein the roll map generation unit may be configured to display the roll map and the connection cause of the electrode connection at the position of the seam.

The determination unit may be in the roll map generation unit or in a controller that controls a movement of the electrode between the unwinder and the rewinder.

The roll map generation system may further include a controller configured to control a movement of the electrode between the unwinder and the rewinder and to communicate with the position measuring instrument to acquire coordinate value data based on the longitudinal position of the electrode, wherein the roll map generation unit may include the determination unit, and the controller may be connected to the signal generator and the seam detector, and the controller may be configured to acquire the first coordinate value of the electrode when the connection advance notice signal is generated, and a second coordinate value of the electrode corresponding to a location of the seam on the electrode, and the controller may be configured to transmit the acquired first and second coordinate values to the determination unit.

According to the present disclosure, when a connection part is generated on an electrode, a cause of the generation can be easily determined. Accordingly, information on the cause of the generation can be used in subsequent processes, and the information can be used for a quality trace of a generated defect or the like.

Further, by displaying a position of the connection part and the information on the cause of the generation of the connection part on a roll map, the effectiveness of information on the roll map can be improved.

The effects of the present disclosure are not limited to the effects mentioned above and additional other effects not described above will be clearly understood from the description of the appended claims by those skilled in the art.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION

Figure 1:
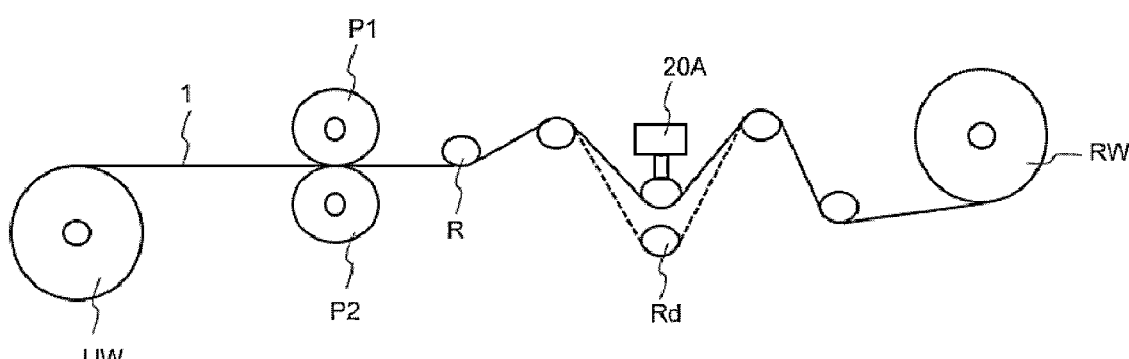
FIG. 1 is a schematic diagram illustrating an example of a roll press process in an electrode manufacturing process.

Hereinafter, a detailed configuration of the present disclosure will be described in detail with reference to the accompanying drawings and various embodiments. Embodiments which will be described below are only examples to help with understanding of the present disclosure, and the accompanying drawings are not illustrated to scale in order to help with understanding of the present disclosure, and dimensions of some components may be exaggerated.

While the present disclosure is open to various modifications and alternative forms, specific embodiments thereof are shown by way of example in the drawings and will herein be described in detail. However, it should be understood that there is no intent to limit the present disclosure to the particular forms disclosed, and on the contrary, the present disclosure is to cover all modifications, equivalents, and alternatives falling within the spirit and scope of the present disclosure.

FIG. 1 is a schematic diagram illustrating an example of a roll press process in an electrode manufacturing process.

As described above, the electrode manufacturing process includes a plurality of sub-processes such as a coating process for forming a positive electrode and a negative electrode by coating a surface of a metal electrode plate, which is a current collector, with an active material and a predetermined insulating material, a roll press process for rolling the coated electrodes, and a slitting process for cutting the rolled electrodes according to their dimensions. The above-described processes are performed while electrodes 1 move between an unwinder UW and a rewinder RW in a roll-to-roll state. For example, as illustrated in FIG. 1, the electrodes 1 are rolled by press rolls P1 and P2 disposed above and below the electrode 1 while the electrodes 1 move between the unwinder UW and the rewinder RW. After being rolled, a direction of the rolled electrode 1 is changed by a predetermined guide roll R to move to the rewinder RW, and is wound. A dancer roll Rd that adjusts the tension of the electrode 1 may be installed on a transfer path of the electrode 1, and a tension sensor 20A that detects the tension of the electrode 1 is installed on the dancer roll. The tension sensor 20A may detect a change in tension of the electrode 1 to detect a disconnection of the electrode 1. The path of the roll press process illustrated in FIG. 1 is only exemplary, but the present disclosure is not limited thereto.

In the manufacturing process of the electrode 1, which includes the roll press process, the electrode 1 may be broken due to excessive tension being applied to the electrode 1 moving in the roll-to-roll state or the presence of a defective electrode part. In general, electrode rolls mounted on the unwinder UW and the rewinder RW have a long traveling distance of 2,000 to 3,000 meters, and the electrode may be often disconnected during the roll press process. In particular, since an excessive force is applied to the electrode 1 before and after the press rolls P1 and P2, an electrode breakage or the like occurs easily. Alternatively, a scrap disposal process for removing a defective portion of the electrode generated in the electrode coating process, which is the previous process, may be performed in the roll press process. Further, as will be described below, when one electrode 1 is used up, a splicing process for connecting an end part of the electrode used up and a beginning part of a new electrode is performed for continuous electrode manufacturing.

In the case of the electrode breakage or the scrap disposal process, for example, a connecting tape coated with an adhesive is attached to the disconnected electrode 1 to connect the electrodes. In the splicing process, the electrodes may be connected using a double-sided tape. As described above, a connection part (seam) is generated in the electrode due to various causes. The electrode connection part may be detected by a seam detector such as a color sensor. Since the connecting tape has a different color from the electrode, a position of the connecting tape can be easily detected by the color sensor.

In general, when the electrode is transferred in a roll-to-roll state, a rotary encoder that can derive a position of the electrode from a rotation amount of a motor is installed on the unwinder and/or the rewinder. Therefore, the position of the electrode at a time point when the seam is detected by the seam detector and the rotary encoder may be specified as an encoder value (position coordinate value).

However, since the electrode connection is caused by various causes as described above, it is difficult to specify a cause of the seam even when the seam is actually detected by the sensor. The present disclosure is a technique for specifying and determining the cause of the occurrence of the electrode connection part or seam.

Figure 2:
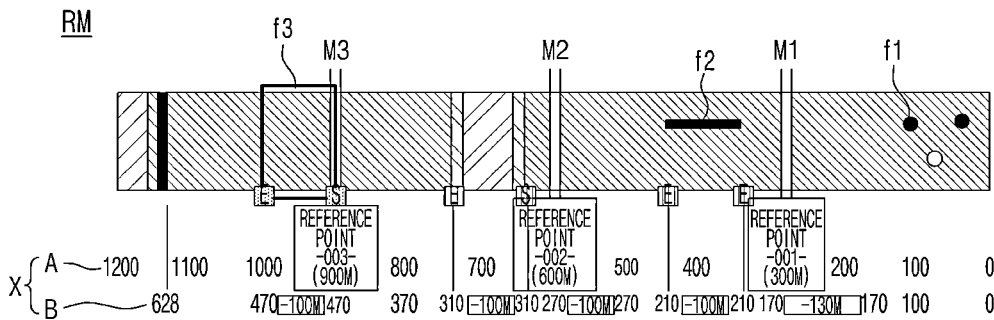
FIG. 2 is a diagram illustrating an example of a roll map obtained by simulating an electrode.

FIG. 2 is a diagram illustrating an example of a roll map obtained by simulating an electrode.

A roll map RM is generated by a predetermined roll map generation system.

As illustrated in FIG. 2, longitudinal dimensions X of an electrode are illustrated on the roll map RM at predetermined intervals as coordinates. On such a roll map RM, information on a defect occurring in the electrode manufacturing process, quality, and the like is illustrated together with coordinates, and thus data related to the quality and the defect in the electrode manufacturing process may be easily identified visually at a glance.

Referring to FIG. 2, information on appearance defects such as a pinhole defect f1 and a line defect f2 is visually displayed at coordinates where the defects have occurred. Further, a mismatched portion f3 between a coated portion and an uncoated portion is also displayed. Other defects such as a poor loading amount defect and the like are also displayed, and the position of the electrode connection part is also displayed. A plurality of the electrode connection parts may be displayed along the electrode, and thus, when the cause of each connection part can be visually displayed, the effectiveness of information on the roll map can be improved.

First Embodiment

Figure 3:
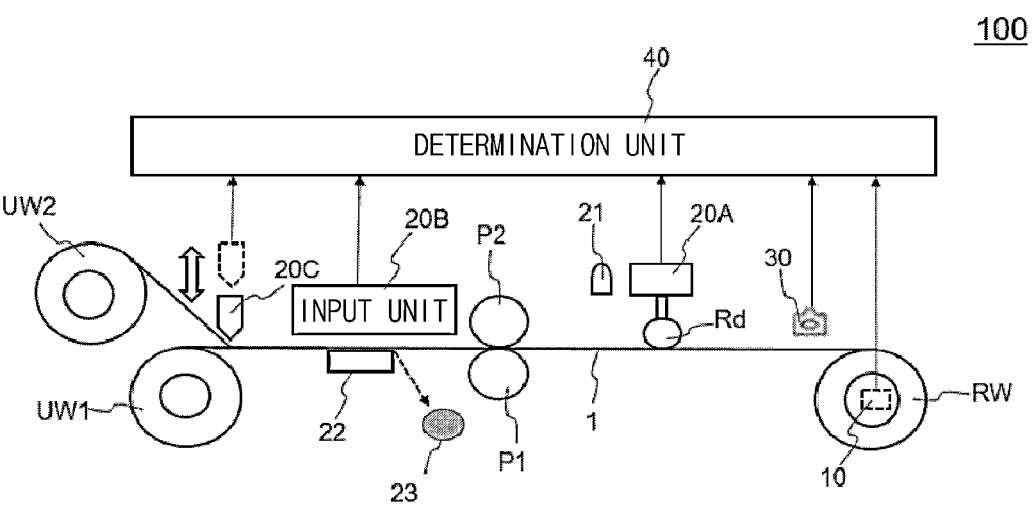
FIG. 3 is a schematic diagram of an electrode connection cause determination system according to an embodiment of the present disclosure.

FIG. 3 is a schematic diagram of an electrode connection cause determination system 100 according to an embodiment of the present disclosure.

The electrode connection cause determination system 100 of the present disclosure includes a position measuring instrument 10 which is configured to, when electrodes 1 move between unwinders UW1 and UW2 and a rewinder RW in a roll-to-roll state, acquire a longitudinal position of the electrode 1 according to a rotation amount of the rewinder as coordinate value data, a signal generator 20 which is configured to, when the electrodes 1 are connected between the unwinders and the rewinder due to a specific reason, generate a connection advance notice signal that is generated in advance in relation to electrode connection, a seam detector 30 that detects a seam attached onto the electrode 1 after the connection advance notice signal is generated, and a determination unit 40 which is configured to, when the seam is detected within a predetermined distance from a coordinate value of the electrode at a time point when the connection advance notice signal is generated, determine the electrode connection caused by the seam as the specific reason.

In the present disclosure, in order to determine the cause of the electrode connection, a position measuring instrument 10 that acquires a longitudinal position of an electrode according to a rotation amount of a rewinder as coordinate value data is provided.

As an example of such a position measuring instrument, a rotary encoder that derives the position of the electrode from a rotation amount of a motor driving the rewinder RW as the coordinate value data may be used. The position of the electrode may also be derived as coordinates by a rotary encoder installed in the unwinder. However, in the present disclosure, it is difficult to apply the rotary encoder of the unwinder in order to derive coordinate values because the present disclosure is also applied to a case of splicing due to material replacement in the unwinder. In particular, the seam detector 30 is disposed near the rewinder RW on which the electrode 1 is finally wound, because the seam detector 30 should detect the seam of the electrode after the signal related to the electrode connection is generated. Since the present disclosure relates to the determination of the cause of the electrode connection on the basis of the signal and the data of the electrode connection part detected by the seam detector 30, coordinate value data is acquired using the rotary encoder of the rewinder RW adjacent to the seam detector 30.

The electrode connection cause determination system 100 of the present disclosure further includes the signal generator 20 that generates a connection advance notice signal that is generated in advance in relation to electrode connection. When the electrode 1 is terminated in any shape and then another electrode or a broken electrode part is connected, a predetermined signal is generated in advance the connection. For example, when the electrode is broken, the tension of the electrode is rapidly reduced, and thus the tension sensor 20A may detect the tension to identify the electrode disconnection. Since the electrodes 1 are connected using a connecting tape when the electrode 1 is disconnected, a sensing signal detected by the tension sensor 20A becomes a connection advance notice signal that is generated in advance in relation to electrode connection. Further, the tension sensor 20A becomes the signal generator 20 that generates the signal. In FIG. 3, the tension sensor 20A is illustrated as being disposed on the electrode as a signal generator. In FIG. 3, an alarm unit 21 which is configured to, when the electrode breakage is detected by the tension sensor, generate an alarm regarding the electrode disconnection is illustrated.

Alternatively, in the roll press process as illustrated in FIG. 3, when a scrap disposal operation of removing a defective portion of the electrode generated in the previous process is performed, an operator inputs a scrap disposal operation signal to a predetermined input unit before the operation starts. An input unit 20B may be, for example, a human machine interface (HMI) control button displayed on a touch screen. The operator removes the defective portion on a work table 22 installed in a defect removal port 23 and connects the remaining electrodes 1 with the connecting tape. The removed defective portion is discarded to the defect removal port 23.

Therefore, in the scrap disposal operation, an operation start signal input by the operator becomes the connection advance notice signal that is generated in advance in relation to electrode connection.

Further, the electrode connection part is generated even during the so-called splicing operation of connecting an old electrode and a new electrode in order to supply the new electrode when one type of electrode is used up. In FIG. 3, an example in which an electrode of an old electrode roll and an electrode of a new electrode roll are connected is schematically illustrated. The splicing operation may be performed manually or automatically. For example, when the old electrode roll and the new electrode roll are replaced on one unwinder, the operation of the system may be stopped, a barcode of the new electrode roll may be scanned by a barcode reader installed in the unwinder, and information on the new electrode roll may be transmitted to a manufacturing execution system (MES), etc. Further, the coupling between a bobbin on which the old electrode roll is wound and a chuck of the unwinder may be released, and a bobbin on which the new electrode roll is wound may be coupled to the chuck of the unwinder. Alternatively, in the case of automatic splicing that automatically connects an old electrode and a new electrode using two unwinders UW1 and UW2, an end part of the old electrode may be cut using a cutter 20C after the electrodes are connected. In the case of the above manual or automatic splicing operation, an electrode replacement signal may be appropriately selected. For example, a scan signal of the barcode reader may become the replacement signal. Alternatively, a coupling or releasing signal of the chuck of the unwinder may become the replacement signal. Alternatively, in the automatic splicing, a rising or falling signal of the cutter 20C may become the replacement signal. In either case, the electrode connection is followed by the splicing. Therefore, the above signals become connection advance notice signals that are generated in advance in relation to electrode connection (splicing). In this case, the signal generator 20 may become a motion sensor or the like connected to the barcode reader, the chuck, or the cutter.

The signal generator 20 and the seam detector 30 may communicate with the position measuring instrument 10 to acquire each of the coordinate value of the electrode at a time point when the signal is generated and the coordinate value of the electrode to which the seam is attached. That is, the signal generator 20 may acquire the encoder value of the position measuring instrument 10 (rotary encoder of the rewinder) at the time point when the signal is generated to acquire the coordinate value of the electrode at the time point when the signal is generated. It should be noted that the coordinate value of the electrode is a signal value of the encoder, not an actual position of a real electrode when the electrode is actually broken. That is, for example, the tension sensor may communicate with the position measuring instrument at a time point when the tension sensor 20A detects a rapid decrease in tension to acquire the coordinate value of the electrode at that time point. However, even when the tension is rapidly reduced, the coordinates of the electrode at that point (time point) cannot be said to be the point where the electrode breakage occurs, and in general, a time difference according to the electrode travel is present between a time point when the tension sensor detects and a time point when the actually broken electrode reaches the tension sensor. Therefore, the electrode breakage actually occurs not at the point where the signal is generated (detected), but at a subsequent part. The seam detector 30 may also communicate with the position measuring instrument 10 to derive the coordinate value (encoder value) of the electrode at the time point where the seam is detected.

The present disclosure includes the determination unit 40 which is configured to, when the seam is detected within a predetermined distance from the coordinate value of the electrode at the time point when the connection advance notice signal is generated, determine the electrode connection caused by the seam as the specific reason.

As described above, in order to determine the cause of the electrode connection, the determination unit 40 should inevitably receive the connection advance notice signal. For example, when the electrode is broken, the operation of the system is stopped, and an operation of connecting the electrode 1 with the connecting tape is performed. In this case, the determination unit may receive the sensing signal detected by the predetermined signal generator (tension sensor) 20 to acquire the coordinate value of the electrode at that time point. The coordinate value of the electrode may be directly input to the determination unit 40 from the signal generator 20 linked with the position measuring instrument 10, or may be input to the determination unit 40 through a controller 40 that controls the movement of the electrode, as will be described below. Further, after the signal is received, it should be possible to confirm that the electrodes 1 are actually connected. To this end, the determination unit 40 should inevitably receive the detection signal from the seam detector 30 and the coordinate value of the electrode of the seam. The determination unit 40 determines the cause of the electrode connection when the seam is detected within a predetermined distance from the coordinate value of the electrode at the time point when the connection advance notice signal is generated, that is, when the position of the seam is identified, and thus the coordinate value of the electrode of the seam should also be specified. The coordinate value of the electrode of the seam may be directly input to the determination unit 40 from the seam detector 30 linked with the seam detector, or may be input to the determination unit through the controller 50 that controls the movement of the electrode, as will be described below.

In FIG. 3, an example in which the coordinate value of the electrode is transmitted to the determination unit 40 by the signal generator 20 and the seam detector 30 is well illustrated.

The electrode connection cause determination system 100 may further include the controller 50 that controls the movement of the electrode between the unwinder UW and the rewinder RW and communicates with the position measuring instrument 10 to acquire the longitudinal position of the electrode as the coordinate value. For example, since the controller 50 such as a programmable logic controller (PLC) controls a roll-to-roll electrode transfer, the controller 50 may be connected to the position measuring instrument 10 to frequently acquire the longitudinal position of the electrode from the position measuring instrument as the coordinate value. Therefore, when the controller 50 is connected to the signal generator 20 and the seam detector 30, the controller 50 may acquire each of the coordinate value of the electrode at the time point when the connection advance notice signal is generated and the coordinate value of the electrode to which the seam is attached.

Figure 4:
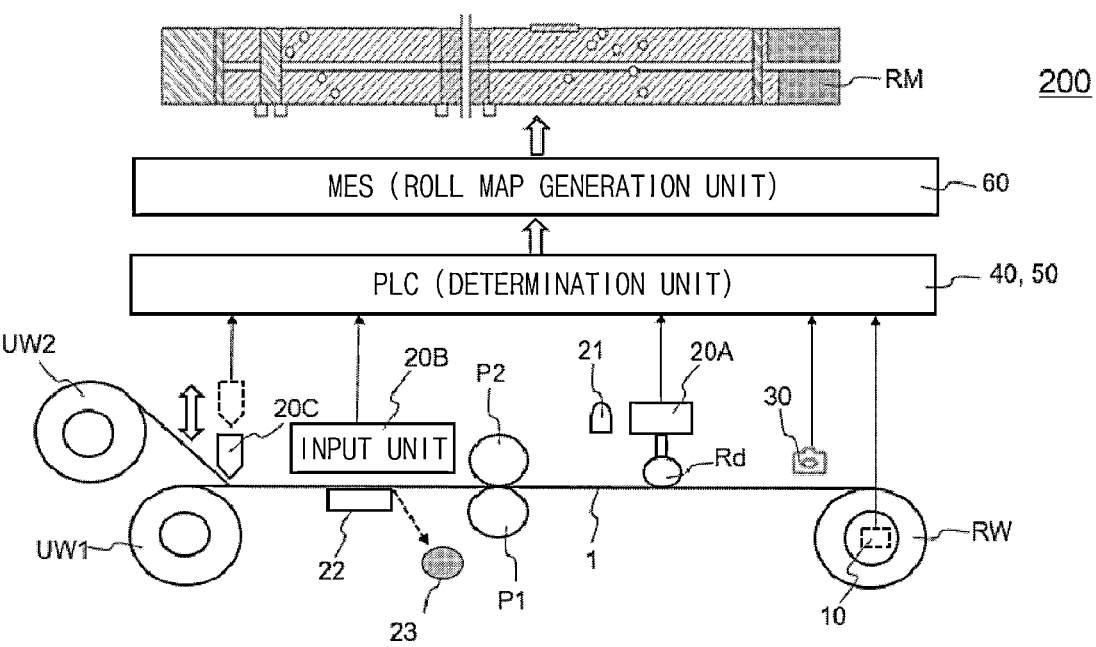
FIG. 4 is a schematic diagram of a roll map generation system according to an embodiment of the present disclosure.
Figure 5:
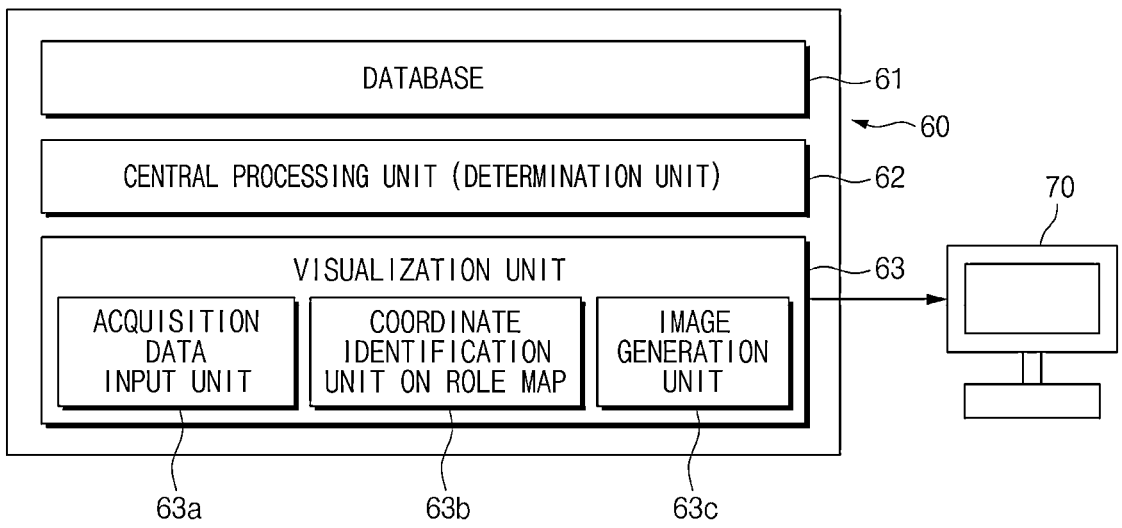
FIG. 5 is a block diagram illustrating a detailed configuration of a roll map generation unit of the roll map generation system of FIG. 4.

Specifically, the determination unit 40 may be provided in the controller 50 that controls the movement of the electrode between the unwinder UW and the rewinder RW or may be provided in the MES that manages the electrode manufacturing process. Referring to FIGS. 4 and 5, an example in which the determination unit 40 may be included as one component of the PLC 50 or may be included as one component of the MES that manages the electrode manufacturing process is well illustrated. As illustrated in FIGS. 4 and 5, the MES may include a roll map generation unit 60 that generates a roll map RM in which an electrode moving in a roll-to-roll state is displayed in a simulated form and predetermined coordinates of a longitudinal position of the electrode and a position of a seam are displayed. Therefore, the roll map generation unit 60 may display the cause of the electrode connection, which is identified by the controller 50 or by the determination unit 40 provided in the roll map generation unit 60, at the position of the seam on the roll map RM. The process of displaying the cause of the electrode connection on the roll map will be described below with reference to a second embodiment.

When the seam is detected within a predetermined distance from the coordinate value of the electrode at a time point when a connection advance notice signal is generated, the determination unit 40 may determine the seam as the cause of the electrode connection. The predetermined distance may be applied differently according to the cause of the electrode connection. Further, it is necessary to determine the predetermined distance as a distance in which a connecting tape can be reliably detected with a predetermined relationship in relation to the cause of the electrode connection from the position (coordinate value of the electrode) at the time point when the connection advance notice signal is generated.

The specification of the predetermined distance for determining the cause of the electrode connection is equally applied to the roll map generation system of the second embodiment. Therefore, the determination of the specific and detailed cause of the electrode connection of the predetermined distance will be described in more detail with reference to the second embodiment.

Second Embodiment

FIG. 4 is a schematic diagram of a roll map generation system 200 according to an embodiment of the present disclosure.

The roll map generation system 200 of the present disclosure may include a position measuring instrument 10 which is configured to, when electrodes move between unwinders and a rewinder in a roll-to-roll state, acquire a longitudinal position of the electrode according to a rotation amount of the rewinder as coordinate value data, a signal generator 20 which is configured to, when the electrodes are connected between the unwinders and the rewinder due to a specific reason, generate a connection advance notice signal that is generated in advance in relation to electrode connection, a seam detector 30 that detects a seam attached onto the electrode after the connection advance notice signal is generated, a determination unit 40 which is configured to, when the seam is detected within a predetermined distance from the coordinate value of the electrode at a time point when the connection advance notice signal is generated, determine that the electrode connection by the seam is caused by the specific reason, and a roll map generation unit 60 that generates a roll map on which the electrode in a simulated form moving in the roll-to-roll state is displayed and predetermined coordinates of the longitudinal position of the electrode and a position of the seam are displayed, wherein the roll map generation unit 60 may display the cause of the electrode connection, which is identified by the determination unit 40 at the position of the seam on the roll map to generate a roll map RM.

In the roll map generation system 200, since the position measuring instrument 10, the signal generator 20, the seam detector 30, and the determination unit 40 are the same as the components of the electrode connection cause determination system of the first embodiment, the same reference numerals are allocated to the corresponding components, and detailed descriptions thereof will be omitted.

The present embodiment includes the roll map generation unit 60 that generates the roll map on which the electrode in the simulated form moving in the roll-to-roll state is displayed and the predetermined coordinates of the longitudinal position of the electrode and the position of the seam are displayed.

FIG. 5 is a block diagram illustrating a detailed configuration of the roll map generation unit of the roll map generation system of FIG. 4.

The roll map generation unit 60 may include a database 61 in which the coordinate data of the electrode, data related to the quality or defect of a normal electrode, etc. are stored, a central processing unit 62 that instructs a visualization unit to visualize and display a role map on the basis of the data stored in the database or data acquired by a seam sensor, an appearance sensor, or other sensors, and a visualization unit 63 that visualizes and displays the role map so as to be checked with the naked eye.

The visualization unit 63 defines a visualization region in which the roll map RM simulating the electrode will be formed and displays the coordinate data on the defined region. The visualization unit 63 may match, visualize, and display various types of inspection data acquired on the electrode and the coordinate data in which the data is acquired. The visualization unit 63 may be connected to the central processing unit 62 and may visualize and display the inspection data and the coordinate data according to the instruction from the central processing unit 62.

As illustrated in FIG. 5, the visualization unit 63 includes an acquisition data input unit 63a, a coordinate identification unit 63b on a role map, and an image generation unit 63c.

The acquisition data input unit 63a receives data from the central processing unit 62. The coordinate identification unit 63b on the role map may define a visualization region in which the roll map will be formed and defines coordinate values of pixels in the visualization region for each data element of acquired source data. The coordinate identification unit 63b may map the acquired data related to the quality or defect and the position data (width direction and length direction) of the electrode 1 and allocate the mapped data onto the visualization region (role map) according to the coordinates of the pixels. The image generation unit 63c may represent the mapped data element allocated to the coordinates of each pixel in the visualization region as one or more legends. The legends mean various shapes such as circles, quadrangles, and triangles displayed in the visualization region, or mean shapes to which colors are allocated. Therefore, by the image generation unit 63c, in the visualization region called a roll map, various data related to quality or defect are visually displayed on the coordinates (coordinates on the roll map) of the pixels corresponding to each position data of the actual electrode 1 in a shape and color display unit designated for each data, and implemented on the roll map, and thus the roll map RM of the present disclosure may be generated.

Further, based on the data stored in a storage such as the database 61, pieces of data corresponding to a specific range may be read from the storage in conjunction with a specific range of the roll map and displayed (image generation) on a screen. In this case, the central processing unit 62 may give a command to the visualization unit 63 to visualize and display the inspection data determined to be abnormal in comparison with the normal data stored in the database 61 so as to be distinguished from other pieces of data.

Setting the size of the above-described visualization region or identifying the coordinates of the visualization region to generate an image may be performed using various conventional user interfaces or various programs or processing tools related to data allocation-processing-analysis and visualization. Therefore, the roll map generation unit 60 is only exemplary, but the present disclosure is not limited to the above-described embodiment.

The roll map generation unit 60 may be, for example, one component of a data processing system such as an MES or the like. The data processing system refers to a system (including hardware or software) that performs input, processing, output, communication, etc. in order to perform a series of manipulations on data. In manufacturing process of the electrode 1, an electrode MES that manages a series of electrode manufacturing processes such as coating, pressing, and slitting processes is provided. Therefore, when the above-described coordinate data, the inspection data, and the like are transmitted to the electrode MES, the electrode MES may generate the above-described roll map. The generated roll map RM may be displayed on a display unit.

The roll map generation unit 60 of the present disclosure may generate the roll map RM on which the cause of the electrode connection which is identified by the determination unit at the position of the seam is displayed. To this end, the roll map generation unit 60 may include the determination unit 40. For example, the central processing unit 62 may include the determination unit 40, and the determination unit of the central processing unit may determine the cause of the electrode connection according to a predetermined logic to display the cause of the electrode connection on the roll map.

Alternatively, the determination unit 40 may be provided in the controller 50 that controls the movement of the electrode. In this case, the roll map generation unit 60 may receive information on the cause of the electrode connection from the determination unit provided in the controller to display the information on the roll map. Alternatively, when the determination unit 40 is provided in the central processing unit, the determination unit 40 may communicate with the position measuring instrument 10 to acquire each of the coordinate value of the electrode at the time point when the connection advance notice signal is generated and the coordinate value of the electrode to which the seam is attached, from the controller 50 that can acquire the longitudinal position of the electrode as the coordinate value and determine the cause of the electrode connection.

Figure 6:
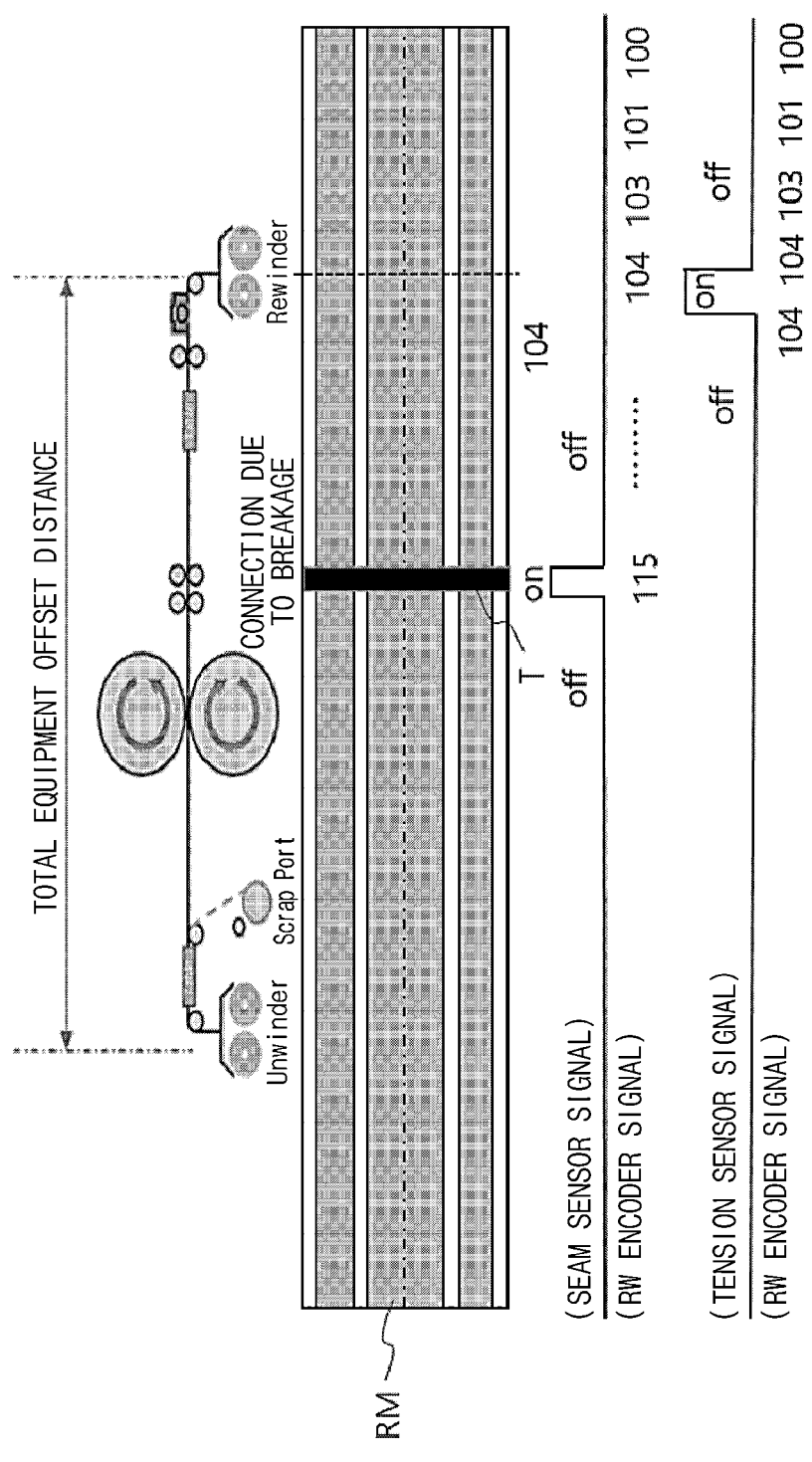
FIG. 6 is a schematic diagram for describing a mechanism of determining an electrode connection cause and generating a role map according to an embodiment of the present disclosure.

FIG. 6 is a schematic diagram for describing a mechanism of determining an electrode connection cause and generating a role map according to an embodiment of the present disclosure.

FIG. 6 illustrates a case in which electrodes are connected when the electrode is broken between an unwinder and a rewinder.

When a tension sensor (signal generator) 20A receives a tension sharp decrease signal (tension sensor on signal), a coordinate value of the electrode at that time is derived. The tension sharp decrease signal becomes a connection advance notice signal. For example, when the tension sensor signal is received from the encoder value of the rewinder at the electrode coordinate of 104 m, the tension sensor signal is continuously turned on before the electrodes are connected again and is turned off after the electrodes are connected.

Thereafter, the seam (connecting tape T) and its coordinate value of the electrode are detected by the seam detector 30 installed adjacent to the rewinder. In this case, the seam T is positioned within at least a total equipment distance (total equipment offset distance) from the coordinate value (104 m) of the electrode at the time point when the connection advance notice signal is generated. That is, since the connection of the electrode is performed within the system, when the seam T is found at a point out of the total equipment distance, it is difficult to regard this case as the electrode connection when the tension sensor signal is induced (in the case of electrode breakage). Therefore, when the seam T is found at a distance within the total equipment distance, for example, 50 m from the coordinate value (104 m) of the electrode where the tension sensor signal is generated, the determination unit 40 may determine an electrode connection caused by a breakage as the cause of the seam (connecting tape) of the electrode. In FIG. 6, since the seam is detected at 115 m, which is a point within 50 m, which is the total equipment distance, from 104 m by the seam detector, the cause of the electrode connection may be displayed as the "broken connection" on the roll map formed by the roll map generation unit 60. In this case, a predetermined distance for determining the cause of the electrode connection becomes the "'total equipment distance."

The cause of the electrode connection may be visually displayed as characters as illustrated in FIG. 6 and may be visually displayed after changing a color of the connecting tape T, a hatching pattern, etc. according to each cause.

Figure 7:
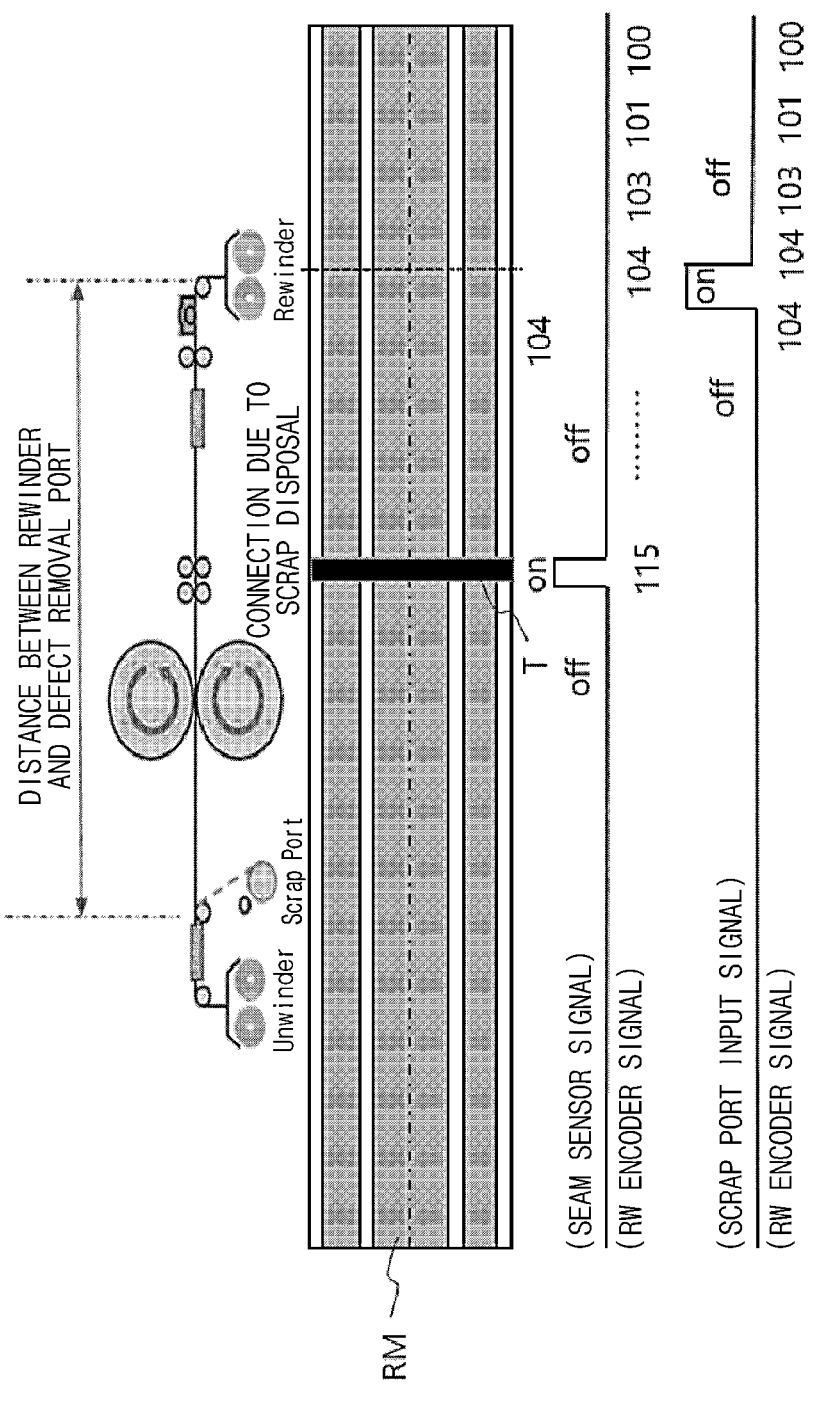
FIG. 7 is a schematic diagram for describing a mechanism of determining an electrode connection cause and generating a role map according to another embodiment of the present disclosure.

FIG. 7 is a schematic diagram for describing a mechanism of determining an electrode connection cause and generating a role map according to another embodiment of the present disclosure.

FIG. 7 illustrates a case in which electrodes are connected in the case of scrap disposal for removing a defective portion of the electrode.

When the operator presses a scrap start button on a manual input unit (signal generator) 20B installed in a defect removal port (scrap port) 23, an input signal and the coordinate value of the electrode at a time point when the input signal is received are transmitted to the determination unit 40 either directly from the manual input unit or through the controller 50 that controls the transfer of the electrode. In the present embodiment, the scrap port input signal becomes a connection advance notice signal. For example, when the scrap port input signal is received from the encoder value of the rewinder with 104 m of the coordinate of the electrode, the scrap port input signal is continuously turned on before the electrodes are connected again and is turned off after the electrodes are connected. Thereafter, the seam and its coordinate value of the electrode are detected by the seam detector installed adjacent to the rewinder.

A distance from the rewinder to the defect removal port 23 in which the scrap disposal operation is performed is preset. For example, when it is assumed that the distance from the rewinder to the defect removal port 23 is 40 m, the seam is positioned within 40 m (i.e., 144 m) from the coordinate value (104 m) of the electrode at the time point when the scrap port input signal is received. In this case, the predetermined distance for determining the cause of the electrode connection becomes the "distance from the rewinder to the defect removal port."

Therefore, when the seam is found within a predetermined distance of 40 m from the coordinate value (104 m) of the electrode at the time point when the input signal is received by the manual input unit, the determination unit 40 may determine the electrode connection caused by scrap disposal as the cause of the seam (connecting tape) T of the electrode. In FIG. 7, since the seam T is detected by the seam detector 30 at 115 m, which is a point within a predetermined distance of 40 m from 104 m, the cause of the electrode connection may be display on the roll map formed by the roll map generation unit 60 as the "scrap disposal connection."

Figure 8:
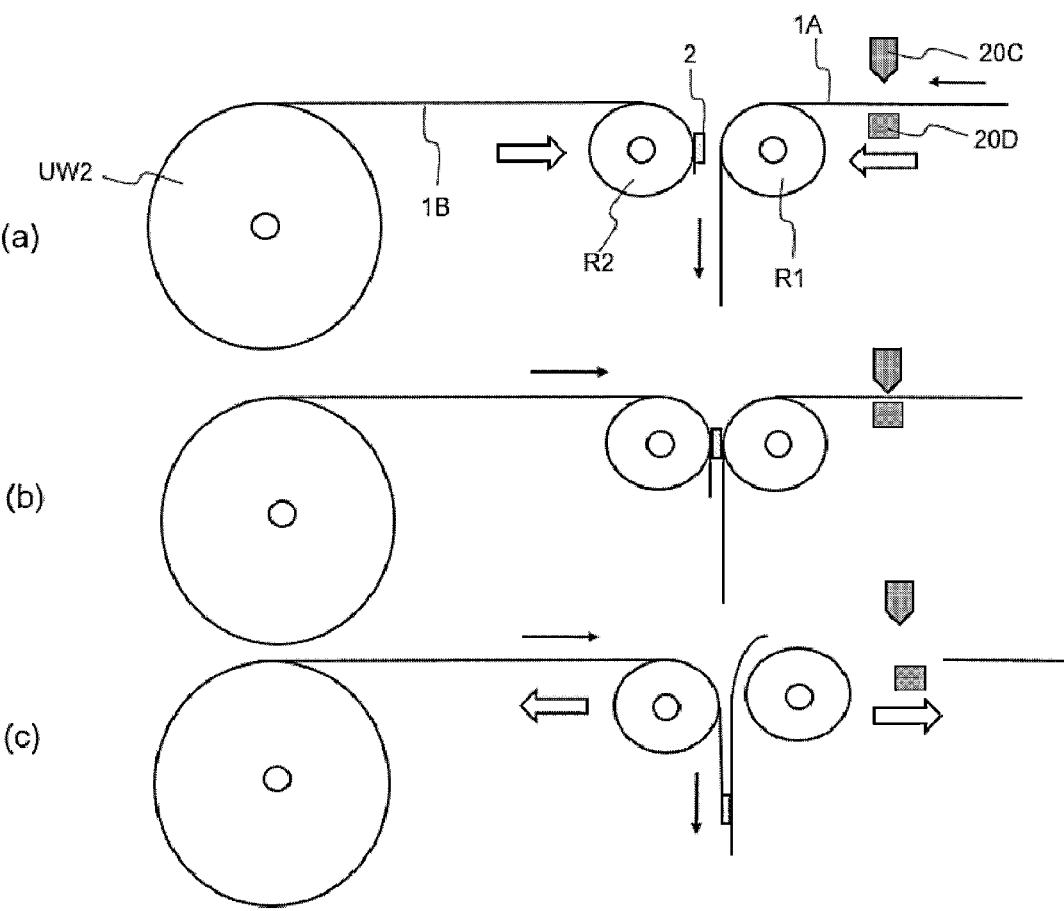
FIG. 8 illustrates schematic diagrams illustrating a splicing process for electrode replacement.

FIG. 8 illustrates schematic diagrams illustrating an automatic splicing process for electrode replacement.

As illustrated in the drawings, an end part 1A of an electrode derived from an old electrode roll (not illustrated) and a beginning part 1B of an electrode derived from a new electrode roll UW2 are connected. For example, in a standby state of the new electrode roll UW2 as illustrated in FIG. 8A, when an electrode termination signal of the old electrode roll is received by a winding diameter sensor (not illustrated) installed on the old electrode roll, a press roll R1 on which the end part 1A of the old electrode is wound and the press roll R2 on which the beginning part 1B of the new electrode is pressed are driven to approach each other (see FIG. 8B). Since a double-sided tape 2 is attached to the beginning part 1B of the new electrode roll, the old electrode and the new electrode are bonded by the pressing of the press rolls. When the old electrode is cut by a cutter 20C installed near the end part 1A of the old electrode after the bond is completed, the electrode of the new electrode roll connected to the old electrode roll moves toward the rewinder (not illustrated) in a roll-to-roll state. Thereby, the roll-to-roll transfer from the unwinder to the rewinder can be continuously performed without interruption. A support 20D is installed on a rear surface of the electrode so that the cutter 20C can easily cut the electrode. Even in the case of such splicing, the electrode connection inevitably occurs.

Figure 9:
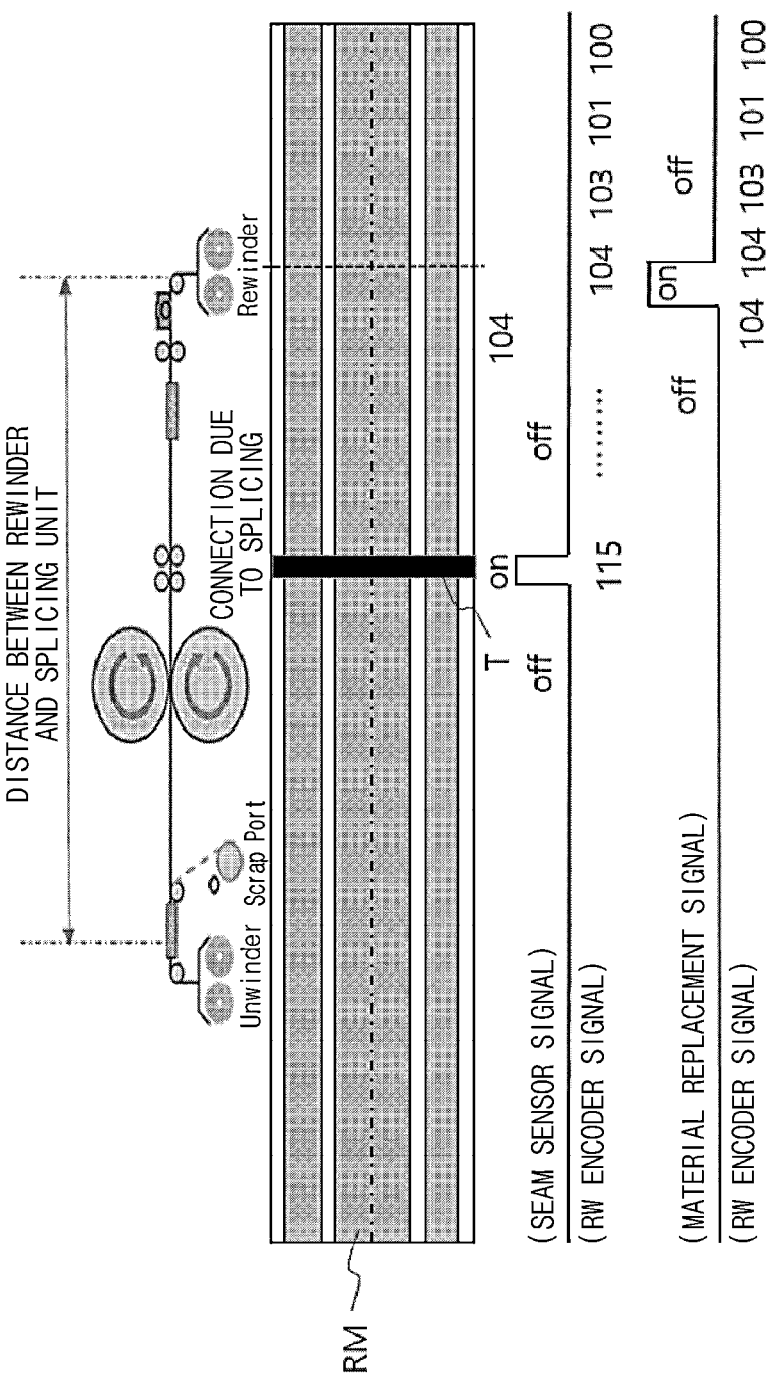
FIG. 9 is a schematic diagram for describing a mechanism of determining an electrode connection cause and generating a role map according to still another embodiment of the present disclosure.

FIG. 9 is a schematic diagram for describing a mechanism of determining an electrode connection cause and generating a role map in the case of the splicing.

When an old electrode and a new electrode are automatically or manually spliced on a splicing table (splicing unit) for electrode replacement, a predetermined electrode replacement signal (splicing signal) is input by an automatic or manual input unit.

The replacement signal may be an operation signal of a motion detection sensor installed in a lifting cylinder connected to the cutter 20C that cuts the old electrode in the case of FIG. 9. Alternatively, when the operator manually presses a splicing start button before the electrodes are connected on the splicing table, the input signal may become an electrode replacement signal.

When the replacement signal is input, the coordinate value of the electrode at that point is transmitted together with the replacement signal to the determination unit. The electrode replacement signal becomes a connection advance notice signal. For example, when the electrode replacement signal is received from the encoder value of the rewinder as the coordinates of the electrode of 104 m, the replacement signal is continuously turned on before the electrodes are connected again and is turned off after the electrodes are connected. Thereafter, the seam T and its coordinate value of the electrode are detected by the seam detector 30 installed adjacent to the rewinder.

A distance from the rewinder to a splicing unit is preset. For example, when it is assumed that the distance from the rewinder to the splicing unit is 45 m, the seam is positioned within 45 m (i.e., 149 m) from the coordinate value (104 m) of the electrode at the time point when the material replacement signal is received. In this case, the predetermined distance for determining the cause of the electrode connection becomes the "distance from the rewinder to the splicing unit."

Therefore, when the seam T is found within a predetermined distance of 45 m from the coordinate value (104 m) of the electrode at the time point when the material replacement signal is received, the determination unit 40 may determine the electrode connection caused by the splicing as the cause of the electrode connection of the seam (connecting tape) of the electrode. In FIG. 9, since the seam is detected by the seam detector 30 at 115 m, which is a point within a predetermined distance of 45 m from 104 m, the cause of the electrode connection may be display on the roll map formed by the roll map generation unit 60 as the "splicing connection."

As described above, according to the present disclosure, when a connection part is formed on an electrode in each sub-process of an electrode manufacturing process in which the electrodes move in a roll-to-roll state, a cause of an electrode connection can be easily determined together with a position of the electrode connection part. Further, by displaying the determined cause of the electrode connection on the roll map, the effectiveness of information on a roll map can be improved.

In the above-described embodiments, representatively, in the case of the electrode breakage, the scrap disposal, and the splicing, the causes of the electrode connection have been described, but the present disclosure can also be applied to an electrode connection caused by other causes. However, when the cause of the electrode connection varies, the connection advance notice signal which is generated before the electrode connection occurs and the "predetermined distance" for identifying the cause of the electrode connection may vary. In this case, by selecting an appropriate signal generator that can detect a signal generated according to the cause and appropriately setting a predetermined distance, the cause of the electrode connection can be identified.

The present disclosure has been described above in more detail with reference to the accompanying drawings and embodiments. However, since the embodiments described in this specification and configurations illustrated in the drawings are only exemplary embodiments and do not represent the overall technological scope of the present disclosure, it is understood that the present disclosure covers various equivalents, modifications, and substitutions at the time of filing of this application.

REFERENCE NUMERALS

1: ELECTRODE
10: POSITION MEASURING INSTRUMENT (ROTARY ENCODER)
UW1, UW2: UNWINDER
RW: REWINDER
20: SIGNAL GENERATOR
20A: TENSION SENSOR
20B: MANUAL INPUT UNIT
20C: CUTTER
30: SEAM DETECTOR
40: DETERMINATION UNIT
50: CONTROLLER
60: ROLL MAP GENERATION UNIT
61: DATABASE
62: CENTRAL PROCESSING UNIT
63: VISUALIZATION UNIT
70: DISPLAY UNIT
T: SEAM (CONNECTING TAPE)
RM: ROLL MAP

The invention claimed is:

1. An electrode connection cause determination system comprising:
   a position measuring instrument configured to, when an electrode moves between an unwinder and a rewinder in a roll-to-roll state, acquire coordinate value data based on a longitudinal position of the electrode determined according to a rotation amount of the rewinder;
   a plurality of signal generators, wherein a signal generator associated with a cause event that results in an electrode connection at the electrode, is configured to generate a connection advance notice signal corresponding to the electrode connection;
   a seam detector configured to detect a seam attached onto the electrode after the connection advance notice signal is generated; and
   a determination unit configured to, when the seam is detected within a predetermined distance from a first coordinate value of the electrode after the connection advance notice signal is generated, determine a cause of the cause event of the electrode connection by the seam among a plurality of causes based on the connection advance notice signal generated by the signal generator associated with the cause event.

2. The electrode connection cause determination system of claim 1, wherein the position measuring instrument is a rotary encoder, and wherein the rotary encoder derives the longitudinal position of the electrode based on a rotation amount of a motor driving the rewinder, and wherein the rotation amount of the motor corresponds to the coordinate value data.

3. The electrode connection cause determination system of claim 1, wherein the signal generator and the seam detector are configured to communicate with the position measuring instrument to acquire the first coordinate value of the electrode when the connection advance notice signal is generated and a second coordinate value of the electrode corresponding to a location of the seam on the electrode.

4. The electrode connection cause determination system of claim 1, further comprising a controller configured to control a movement of the electrode between the unwinder and the rewinder and to communicate with the position measuring instrument to acquire the coordinate value data based on the longitudinal position of the electrode, wherein the controller is connected to the signal generator and the seam detector, and wherein the controller is configured to acquire the first coordinate value of the electrode when the connection advance notice signal is generated and a second coordinate value of the electrode corresponding to a location of the seam on the electrode.

5. The electrode connection cause determination system of claim 1, wherein the determination unit is in the controller or in a manufacturing execution system (MES) that manages an electrode manufacturing process.

6. The electrode connection cause determination system of claim 5, wherein the MES includes a roll map generation unit configured to generate a roll map, wherein the roll map comprises a simulated electrode in the roll-to-roll state, wherein the roll map comprises predetermined coordinates of the longitudinal position of the electrode and a position of the seam, and wherein the roll map generation unit is configured to display the roll map and the connection cause of the electrode connection at the position of the seam on the roll map.

7. The electrode connection cause determination system of claim 1, wherein the cause event is an electrode disconnection due to an electrode breakage, wherein the signal generator is a tension sensor configured to detect tension of the electrode moving in the roll-to-roll state, wherein, when the seam is detected within a first distance defined by adding a total equipment distance from the rewinder to the unwinder with a second distance corresponding to a second coordinate value of the electrode when a sensing signal is generated by the tension sensor, the determination unit is configured to determine that a connection cause of the electrode connection by the seam corresponds to the electrode breakage.

8. The electrode connection cause determination system of claim 1, wherein the cause event is scrap disposal of removing and discarding a defective portion of the electrode;

wherein the signal generator is a manual input unit installed in a defect removal port; and wherein, when the seam is detected within a first distance defined by adding a second distance from the rewinder to the defect removal port with a third distance based on a second coordinate value of the electrode when an input signal is received by the manual input unit, the determination unit is configured to determine that a connection cause of the electrode connection by the seam corresponds to the scrap disposal.

9. The electrode connection cause determination system of claim 1, wherein the cause event is electrode splicing of connecting an old electrode and a new electrode for an electrode replacement, wherein the signal generator is an input unit, wherein the input unit is configured to receive a replacement signal, and wherein, when the seam is detected within a first distance defined by adding a second distance from the rewinder to a splicing unit with a third distance based on a second coordinate value of the electrode when the replacement signal is received by the input unit, the determination unit determines that a connection cause of the electrode connection by the seam corresponds to the electrode splicing for the electrode replacement.

10. A roll map generation system comprising:

a position measuring instrument configured to, when an electrode moves between an unwinder and a rewinder in a roll-to-roll state, acquire coordinate value data based on a longitudinal position of the electrode determined according to a rotation amount of the rewinder;

a plurality of signal generators, wherein a signal generator associated with a cause event that results in an electrode connection at the electrode, is configured to generate a connection advance notice signal corresponding to the electrode connection;

a seam detector configured to detect a seam attached onto the electrode after the connection advance notice signal is generated;

a determination unit configured to, when the seam is detected within a predetermined distance from a first coordinate value of the electrode after the connection advance notice signal is generated, determine a cause of the cause event of the electrode connection by the seam among a plurality of causes based on the connection advance notice signal generated by the signal generator associated with the cause event; and a roll map generation unit configured to generate a roll map comprises a simulated electrode in the roll-to-roll state, wherein the roll map comprises predetermined coordinates of the longitudinal position of the electrode and a position of the seam, and wherein the roll map generation unit is configured to display the roll map and the connection cause of the electrode connection at the position of the seam.

11. The roll map generation system of claim 10, wherein the determination unit is in the roll map generation unit or in a controller that controls a movement of the electrode between the unwinder and the rewinder.

12. The roll map generation system of claim 10, further comprising a controller configured to control a movement of the electrode between the unwinder and the rewinder and to communicate with the position measuring instrument to acquire coordinate value data based on the longitudinal position of the electrode, wherein the roll map generation unit includes the determination unit, wherein the controller is connected to the signal generator and the seam detector, wherein the controller is configured to acquire the first coordinate value of the electrode when the connection advance notice signal is generated and a second coordinate value of the electrode corresponding to a location of the seam on the electrode, and wherein the controller is configured to transmit the acquired first and second coordinate values to the determination unit.

13. The roll map generation system of claim 10, wherein the cause event is an electrode disconnection due to an electrode breakage, wherein the signal generator is a tension sensor that detects tension of the electrode moving in the roll-to-roll state, wherein, when the seam is detected within a first distance defined by adding a total equipment distance from the rewinder to the unwinder with a second distance corresponding to a second coordinate value of the electrode at when a sensing signal is generated by the tension sensor, the determination unit is configured to determine that a connection cause of the electrode connection by the seam corresponds to the electrode breakage.

14. The roll map generation system of claim 10, wherein the cause event is scrap disposal of removing and discarding a defective portion of the electrode, wherein the signal generator is a manual input unit installed in a defect removal port, and wherein, when the seam is detected within a first distance defined by adding a second distance from the rewinder to the defect removal port with a third distance based on a second coordinate value of the electrode when an input signal is received by the manual input unit, the determination unit is configured to determine that a connection cause of the electrode connection by the seam is caused by the scrap disposal.

15. The roll map generation system of claim 10, wherein the cause event is electrode splicing of connecting an old electrode and a new electrode for electrode replacement, wherein the signal generator is an input unit, wherein the input unit is configured to receive a replacement signal, and wherein, when the seam is detected within a first distance defined by adding a second distance from the rewinder to a splicing unit with a third distance based on a second coordinate value of the electrode when the replacement signal is received by the input unit, the determination unit is configured to determine that a connection cause of the electrode connection by the seam corresponds to the electrode splicing for the electrode replacement.

* * * * *